Oct. 25, 1955  A. M. ARMOUR  2,721,973
MAGNETIC TESTING DEVICE
Filed Dec. 29, 1952

Inventor:
Alan M. Armour,
by Paul A. Frank
His Attorney.

United States Patent Office 2,721,973
Patented Oct. 25, 1955

2,721,973

MAGNETIC TESTING DEVICE

Alan Marsh Armour, Manchester, England, assignor to Metropolitan-Vickers Electrical Company Limited, London, England, a company of Great Britain Application December 29, 1952, Serial No. 328,363

Claims priority, application Great Britain January 4, 1952

7 Claims. (Cl. 324—34)

This invention relates to magnetic testing devices and in particular to such devices, for example permeameters, which depend for their operation on the application of a known magnetic flux through a specimen to be tested and the subsequent measurement of the field strength induced in, or adjacent the surface of, the specimen. One of the most important objects of the invention is to provide an improved self-contained magnetic testing device requiring no electrical supplies.

According to one but not necessarily the broadest aspect of the present invention, the improved magnetic testing device comprises a generally U-shaped yoke of magnetic material having an opening therein which can accommodate a permanently magnetized member arranged for rotation about an axis lying transversely of the magnetic path through the yoke and magnetized transversely of said axis, whereby a magnetic flux controllable by variation of the angular position of the permanently magnetized member may be produced through the yoke. Between the legs of the yoke is positioned a magnetometer which includes a permanent magnet element of low permeability and high coercive force, effectively pivoted about an axis substantially perpendicular to its magnetic axis and so mounted on a support carried by the yoke that when the poles of the yoke are placed against the surface of material under test to apply a variable flux therethrough, the magnetometer element lies adjacent the surface with its pivot axis substantially normal to the surface so that the element will be deflected in accordance with the strength of the field produced adjacent said surface due to the applied flux.

Scales can be provided in association with the permanently magnetized member and the magnetometer element for indicating their angular positions, thus indicating respectively both in magnitude and sense the flux applied to the material under test and the resulting field strength adjacent the surface thereof. The readings on the two scales may then be co-related in known manner to provide information as to the nature of the test material.

Advantageously the permanently magnetized member or control magnet is cylindrical or at least has pole faces of part-cylindrical form, the opening in the yoke being provided with correspondingly curved surfaces.

In carrying out the invention it is preferred to use for the magnet element of the magnetometer the silver-manganese-aluminum alloy known as Silmanal and described in British patent specifications Nos. 406,086 and 535,168. This alloy is composed of about 86.5% silver, 9% manganese and 4.5% aluminum. Further description of this alloy and its fabrication can be found in a publication of the Carboloy Dept. of the General Electric Company, 1 River Road, Schenectady, N. Y., enittled "Permanent Magnet Design Manual" and identified as manual CDP–609 (N. B. page 33). This alloy has a low permeability, which results in lateral attractions on the magnet due to adjacent magnetic material being very small, and a high coercivity which permits of the magnetometer element being extremely small, without sacrificing sensitivity of the magnetometer. In this way, by making the element small and arranging its mounting so that it may be positioned as close to the surface of the test material as possible, it is possible to measure the field strength in a small zone close to that surface.

The operating elements of the magnetometer are conveniently mounted between the legs of the U-shaped yoke on a non-magnetic base plate which is supported between the inner surfaces of said legs, so as to lie with its other side substantially co-planar with the end faces of the legs, whereby a substantially planar surface will be presented to a test piece. In order that the magnetometer element may be as close as possible to the surface of material under test, it is preferably arranged to be suspended in a recess formed in the base plate.

Advantageously, transverse grooves may be formed in the inner surfaces of the legs of the yoke adjacent their free ends to receive opposite edges of the base plate whereby the base plate, with the operating elements of the magnetometer mounted thereon, can be slid along the grooves into or out of position between the legs. With this arrangement, a number of interchangeable magnetometers mounted on similar base plates and having, for instance, different sensitivities may be provided and the most suitable one for a particular test selected and slid into position in the magnet structure.

In order that the invention may be more clearly understood, reference will now be made to the accompanying drawing in which.

Figure 1:
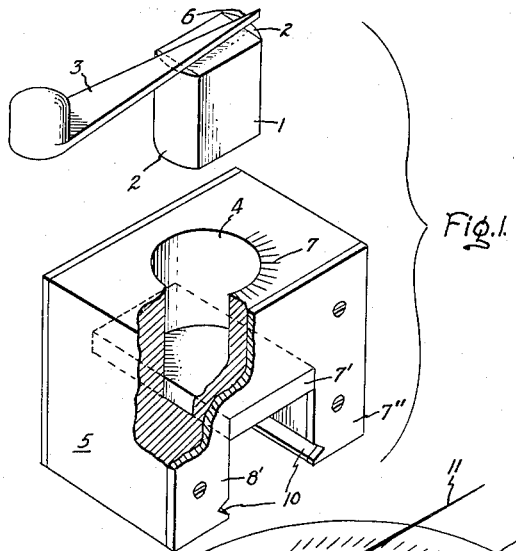
Fig. 1 is an exploded, perspective view of a portion of a preferred form of magnetic testing device according to the invention.

Referring to Fig. 1, the testing flux is provided by a permanently magnetized member or control magnet comprising a rectangular block 1 of preferably anisotropic permanent magnet material, having at the magnetic ends thereof pole shoes 2, as of mold steel, the cross-sections of which are segments of a circle so that the control magnet is in effect of part-cylindrical form. This magnet, 1—2, is rotatable by means of a handle 3 in a cylindrical opening 4 formed in a U-shaped yoke 5, the arrangement being such that by rotating the magnet 1—2, the component of flux directed round the yoke may be varied, whereby the flux supplied to a test piece (not shown in Fig. 1 but which is arranged magnetically in series across the end of the yoke) may be varied. A pointer 6 or mark on the magnet 1—2 co-operates with a scale 7 marked on the yoke around the cylindrical opening 4 to provide an indication of the angular position of the magnet 1—2, and hence a measure of the flux applied to the test piece, in magnitude and sense. Opening 4 may be closed at its lower end, if desired, by a non-magnetic spacer 7'.

The strength of the field produced adjacent the surface of the test piece is measured by a moving magnet magnetometer 8 (Fig. 2) which will be described later in greater detail. The operating members of the magnetometer are mounted on a non-magnetic base plate 9 adapted to be slid into position between the legs 7", 8' of yoke 5 along grooves 10 formed in these legs, the arrangement being such that the outer surface of the base plate 9 and the ends of the yoke legs are substantially co-planar. A pointer 11 is arranged to move over a zero-center scale 12, which is conveniently marked on a plate 9' forming an extension of the base plate 9, in accordance with the rotation of the magnet element of the magnetometer 8, the magnitude and direction of this rotation depending on the magnitude and sense of the field being measured.

Figure 2:
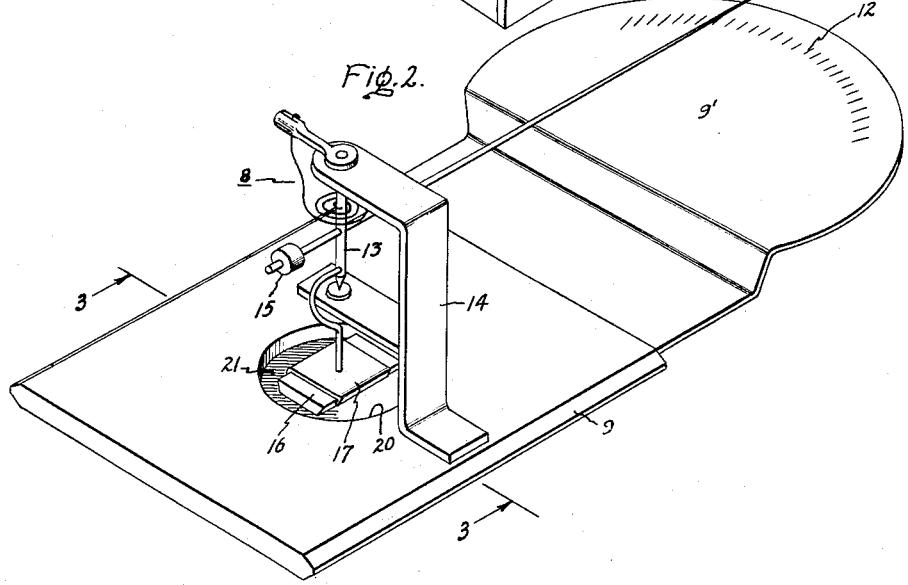
Fig. 2 is an enlarged perspective view of a magnetometer adapted to fit between the legs of the magnet yoke of Fig. 1 according to the invention.
Figure 3:
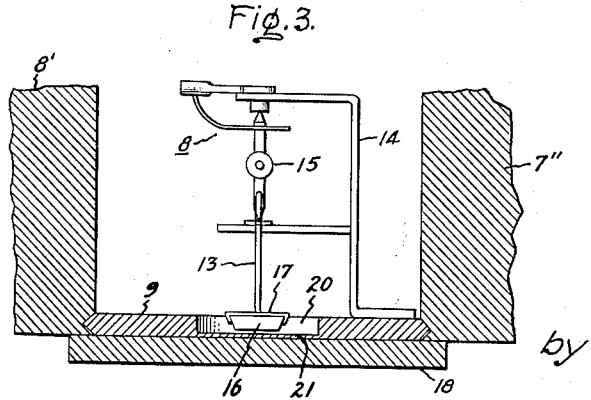
Fig. 3 is a cross-section view taken along line 3—3 of Fig. 2 with the magnetometer assembled in the yoke of Fig. 1.

Referring more specifically now to Figs. 2 and 3, a non-magnetic shaft 13 turning in jewelled pivots in a support 14 mounted on the base plate 9 carries the pointer 11 of the magnetometer 8, the weight of which is counterbalanced by a weight 15. A small flat permanent magnet 16 of the aforementioned Silmanal alloy is suspended from this shaft 13 from a point on it below the pointer, the suspension being shaped as shown so that the suspension axis of the magnet 16 coincides with the axis of the shaft 13. The magnet 16 is fixed in a shoe 17 with its magnetic length parallel to the pointer 11 and with the plane of its largest face parallel to the plane of the base plate 9.

When the apparatus is in use, a test piece 18 (Fig. 3) is brought into position across the ends of the yoke 5 so that a magnetic field is set up in the test piece acting at right angles to the illustrated zero position of the length of the magnet 16; this thus tends to turn into the line with the magnetite field, such movement being restrained by the hair-spring 19.

The deflection of the magnetometer changes quickly as the magnet 16 is moved away from the material under test, and in order that the magnet 16 may be as close to the test piece as possible, it is suspended in a cavity or recess 20 in the base plate 9, a very thin section 21 of the base plate 9 covering the bottom of the cavity 20 to exclude draughts and to support oil (not shown) which surrounds the magnet 16 and thereby damps the motion of the suspension without having any effect on the magnitude of the deflection, assuming sufficient time is given for the magnet 16 to reach its equilibrium position.

In using the apparatus, co-relation in a known manner of the readings on the two scales 7 and 12 when a test piece is brought into proximity with the end faces of the yoke legs, the indication on the scale 7 being a measure of the flux applied to the test piece and that on the scale 12 a measure of the field strength at the surface of the test piece, will result in information being obtained as to the nature of the test piece. The device must of course be initially calibrated and this can be done for any conditions of use with known test pieces under the same conditions.

In use, in suitable cases, it is contemplated that either the position of the magnet 1—2 or the magnetometer reading may be maintained fixed, while the scale of the other is observed for changes as different test pieces or different parts of the same test piece are tested.

The magnetic testing device of the present invention has many applications of which may be mentioned the following:

(1) Thickness measurement of ferrous plates up to at least ¼″ from one side only;
(2) Detection of lamination defects in ferrous plates up to at least ¼″ thick;
(3) Detection of sub-surface and surface defects in magnetic components;
(4) Thickness measurement of non-ferrous layers on ferrous plates from the layer side only;
(5) Sorting of mixed compositions of steel, especially as regards carbon variation;
(6) Assessment of magnetic properties of magnetic test pieces.

What I claim as new and desire to secure by Letters Patent of the United States is:

1. A magnettic testing device comprising a generally U-shaped yoke of magnetic material having an opening therein, a permanently magnetized member rotatably disposed within said opening for producing in said yoke a magnetic flux controllable by variation of the angular position of said member in said opening, and a magnetometer positioned in the gap between the legs of said generally U-shaped yoke, the gap between the legs being adapted to be at least partly shunted adjacent to said magnetometer by a specimen of material undergoing test, whereby said magnetometer can measure the strength of the magnetic field adjacent the specimen due to the flux supplied by the permanently magnetized member.

2. A magnetic testing device comprising a generally U-shaped yoke of magnetic material having an opening therein, a permanently magnetized member rotatably disposed within said opening for producing in said yoke a magnetic flux controllable by variation of the angular position of said member in said opening, and a magnetometer positioned in the gap between the legs of said generally U-shaped yoke, said magnetometer including a permanent magnet element of low permeability and high coercive force mounted rotatably about an axis substantially perpendicular to its magnetic axis, the gap between the legs of said yoke being adapted to be at least partly shunted by a specimen of material undergoing test the surface of which is adjacent to said magnetic element and substantially normal to the axis about which said magnet element is supported, whereby said element will be deflected in accordance with the strength of the field produced adjacent said surface due to the flux supplied by the permanently magnetized member.

3. A magnetic testing device comprising a generally U-shaped yoke of magnetic material having an opening therein, a permanently magnetized member rotatably disposed within said opening for producing in said yoke a magnetic flux controllable by variation of the angular position of said member in said opening, a magnetometer positioned in the gap between the legs of said generally U-shaped yoke, said magnetometer including a permanent magnet element mounted rotatably about an axis substantially perpendicular to its magnetic axis, and means for positioning a test specimen to at least partly shunt the gap between the legs of said yoke with one of its surfaces adjacent to said magnetic element and substantially normal to the axis about which said magnetic element is supported, whereby said element will be deflected in accordance with the strength of the field produced adjacent said surface due to the flux supplied by the permanently magnetized member.

4. A magnetic testing device as in claim 3 in which said permanently magnetized member forms at least a part of a cylinder in at least the portions thereof constituting the pole faces, the opening in said yoke being provided with correspondingly curved surfaces.

5. A magnetic testing device as in claim 3 in which said magnetometer includes a non-magnetic base plate upon which said permanent magnet element is supported and which is supported between the legs of said yoke bridging the gap therebetween, whereby the end faces of said yoke and said non-magnetic base member present a substantially planar surface to a test specimen.

6. A magnetic testing device as in claim 5 in which said magnet element is supported within a recess formed in said base plate.

7. A magnetic testing device as in claim 5 in which the legs of said yoke are formed with transverse grooves adjacent the free ends thereof and said base plate is formed with opposite mating edges, whereby said magnetometer can be slid into and out of position in the gap between the legs of said yoke.

References Cited in the file of this patent

UNITED STATES PATENTS

| | | |
|---|---|---|
| 1,000,938 | Le Pontois | Aug. 15, 1911 |
| 1,966,984 | Lichtenberger et al. | July 17, 1934 |
| 2,469,476 | Sellars | May 10, 1949 |

FOREIGN PATENTS

| | | |
|---|---|---|
| 601,490 | Great Britain | May 6, 1948 |